US010935168B2

(12) United States Patent
Yu et al.

(10) Patent No.: US 10,935,168 B2
(45) Date of Patent: Mar. 2, 2021

(54) SPOOLABLE REINFORCED THERMOPLASTIC PIPE FOR SUBSEA AND BURIED APPLICATIONS

(71) Applicant: Polyflow LLC, Midland, TX (US)

(72) Inventors: Liang Yu, Katy, TX (US); Jing Liu, Katy, TX (US)

(73) Assignee: Polyflow LLC, Midland, TX (US)

( * ) Notice: Subject to any disclaimer, the term of this patent is extended or adjusted under 35 U.S.C. 154(b) by 0 days.

(21) Appl. No.: 16/197,765

(22) Filed: Nov. 21, 2018

(65) Prior Publication Data

US 2019/0162335 A1    May 30, 2019

Related U.S. Application Data

(60) Provisional application No. 62/592,167, filed on Nov. 29, 2017.

(51) Int. Cl.
*F16L 11/08* (2006.01)
*F16L 11/12* (2006.01)
*F16L 11/16* (2006.01)

(52) U.S. Cl.
CPC .......... *F16L 11/088* (2013.01); *F16L 11/12* (2013.01); *F16L 11/16* (2013.01)

(58) Field of Classification Search
CPC . F16L 1/083; F16L 1/082; F16L 11/16; F16L 11/22
USPC ........ 138/123–127, 130, 131, 133–135, 138, 138/144
See application file for complete search history.

(56) References Cited

U.S. PATENT DOCUMENTS

| 5,499,661 | A | * | 3/1996 | Odru | F16L 11/083 138/124 |
| 5,645,109 | A | * | 7/1997 | Herrero | F16L 11/082 138/130 |
| 5,813,439 | A | * | 9/1998 | Herrero | F16L 11/082 138/130 |
| 7,114,526 | B2 | * | 10/2006 | Takagi | F16L 11/085 138/127 |
| 7,923,126 | B2 | * | 4/2011 | Gudme | B32B 1/08 428/626 |
| 8,783,300 | B2 | * | 7/2014 | Hahn | B29D 23/001 138/125 |

(Continued)

*Primary Examiner* — Patrick F Brinson
(74) *Attorney, Agent, or Firm* — Osha Bergman Watanabe & Burton LLP (57) ABSTRACT

A reinforced thermoplastic pipe having a polymeric barrier layer formed about a longitudinal axis; at least one first non-metallic reinforcement layer configured to carry an internal pressure load surrounding the polymeric barrier layer; at least one second non-metallic reinforcement layer configured to carry an axial load surrounding the at least one first reinforcement layer; and a polymeric cover layer surrounding the at least one second reinforcement layer. At least one of the first or second reinforcement layers is braided. In some embodiments, the lay angles of the first and second reinforcement layers are selected to reduce the axial compression force in the pipe in a constrained application. In another embodiment, an interior helical metallic layer around which the polymeric barrier layer is formed, the interior layer being an interlocked metallic carcass, a flat helically wound strip or a helically wound wire.

5 Claims, 3 Drawing Sheets

(56) References Cited

U.S. PATENT DOCUMENTS

| | | | | |
|---|---|---|---|---|
| 8,967,205 B2* | 3/2015 | Kalman | ................ | F16L 11/083 138/134 |
| 2005/0067034 A1* | 3/2005 | Thomson | .............. | F16L 11/082 138/135 |
| 2011/0162750 A1* | 7/2011 | Marchand | ................ | C21D 9/08 138/134 |
| 2016/0097472 A1* | 4/2016 | Foti | ........................ | F16L 11/15 138/134 |

* cited by examiner

30  Fig. 6

SPOOLABLE REINFORCED THERMOPLASTIC PIPE FOR SUBSEA AND BURIED APPLICATIONS

BACKGROUND

Spoolable reinforced thermoplastic pipe (RTP) is used to transport production fluids, such as oil and/or gas and/or water, from one location to another. RTP is particularly useful in onshore static applications. RTP is typically formed as an assembly of layered materials that form a fluid and pressure-containing conduit. The multi-layer structure of the RTP may include a thermoplastic internal fluid barrier, one or more reinforcement layers and a cover layer. RTP used in static onshore applications may not be suitable for static or dynamic offshore applications due in part to the addition of external pressure loads.

The pipe structure of RTP allows large deflections without causing bending stresses that impair the pipe's functionality over its lifetime. RTP's for subsea applications are designed for both internal and external pressure loads. RTP's should also be able to resist external hydrostatic pressure at the design water depth when no internal pressure is present, such that collapse of the RTP does not occur. RTP's in dynamic applications should also accommodate cyclic bending loads.

Flexible pipe, such as described in API Recommended Practice 17B, has been used for deep water (greater than 1500 feet (457 meters)) and ultra-deep water (greater than 5000 feet (1524 meters)) applications for a number of years. In view of the external pressures experienced by flexible pipe at such water depths, RTP has to withstand external hydrostatic forces to be applied in such applications.

For buried applications, the pipe may be subject to upheaval buckling due to internal pressure and thermal loads. Pipe having high axial stiffness may be desirable for buried applications to minimize longitudinal growth of the pipe when subject to internal pressure and thermal loads, thus reducing the potential for occurrence of upheaval buckling.

SUMMARY

In one or more embodiments, a reinforced thermoplastic pipe may include a polymeric barrier layer formed about a longitudinal axis, at least one first non-metallic reinforcement layer configured to carry an internal pressure load surrounding the polymeric barrier layer, at least one second non-metallic reinforcement layer configured to carry an axial load surrounding the at least one first reinforcement layer, and a polymeric cover layer surrounding the at least one second reinforcement layer. At least one of the first or second reinforcement layers is braided and the lay angles of the first and second reinforcement layers are selected to reduce the axial compression force in the pipe in a constrained application. The at least one first non-metallic reinforcement layer is braided or is helically wound as two counter wound sublayers having a lay angle from about 60 to 85 degrees and the at least one second non-metallic reinforcement layer is braided or is helically wound as two counter wound sublayers having a lay angle from about 20 to about 40 degrees. In some embodiments, the lay angles of the at least one first non-metallic layer and the at least one second non-metallic reinforcement layer are selected to achieve an unconstrained pipe elongation of less than 0.6%. In some embodiments, the reinforced pipe of claim 2, wherein the lay angles of the at least one first non-metallic layer and the at least one second non-metallic reinforcement layer are selected to achieve an unconstrained pipe elongation of less than 0.3%.

In one or more embodiments, a reinforced thermoplastic pipe may include a polymeric barrier layer formed about a longitudinal axis, at least one first non-metallic reinforcement layer configured to carry an internal pressure load surrounding the polymeric barrier layer, at least one second non-metallic reinforcement layer configured to carry an axial load surrounding the at least one first reinforcement layer, a polymeric cover layer surrounding the at least one second reinforcement layer, and an interior helical metallic layer around which the polymeric barrier layer is formed. The interior layer may be an interlocked metallic carcass, a flat helically wound strip or a helically wound wire. The reinforced pipe may have a collapse resistance threshold (maximum design water depth) ranging from about 100 feet to about 5000 feet.

DETAILED DESCRIPTION

The following is directed to various embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

References herein to terms such as "inner" or "interior" and "outer" or "exterior" refer, respectively, to directions toward and away from the center of the referenced element, and the terms "radial" and "axial" refer, respectively, to directions perpendicular and parallel to the longitudinal central axis of the referenced element are made by way of example, and not by way of limitation, to establish a frame of reference. It is understood that various other reference frames may be employed for describing the invention.

In the following discussion and in the claims, the terms "including" and "comprising" are used in an open-ended fashion, and thus should be interpreted to mean "including, but not limited to . . . " Also, the terms "disposed," "attached," "couple," or "couples" are intended to mean either an indirect or direct connection. For example, if a first component is coupled to a second component, that connection may be through a direct connection, or through an indirect connection via other components, devices, and connections.

In one aspect, embodiments disclosed herein relate to reinforced thermoplastic pipe for onshore, buried, offshore and subsea applications. More specifically, embodiments disclosed herein relate to reinforced thermoplastic pipe having a multi-layer structure including an internal pressure barrier layer, one or more reinforcement layers and an extruded outer cover layer. In one or more embodiments, the one or more reinforcement layers includes a layer mainly to resist an internal pressure load and a layer to mainly resist an axial load. In one or more embodiments, the reinforcement layers may resist combined internal pressure and axial loads. In some embodiments, the reinforced thermoplastic pipe may include further layers.

Embodiments herein disclose a spoolable RTP that provides a conduit for conveying fluids (i.e., liquids and gases) along the length of the spoolable RTP. For example, the spoolable RTP can convey fluids from the surface to downhole for operations upon cased or uncased wellbores or upon reservoirs from which fluids flow to/from the surface via the wellbore. The spoolable RTP can convey fluids or gases to hydraulic or pneumatic machines operably coupled to the spoolable RTP. The spoolable RTP can also be used to convey fluids from the surface to downhole, or to/from other fluid sources, tanks or pipes, such as transmission or distribution pipelines, or to/from other desired locations.

Figure 1:
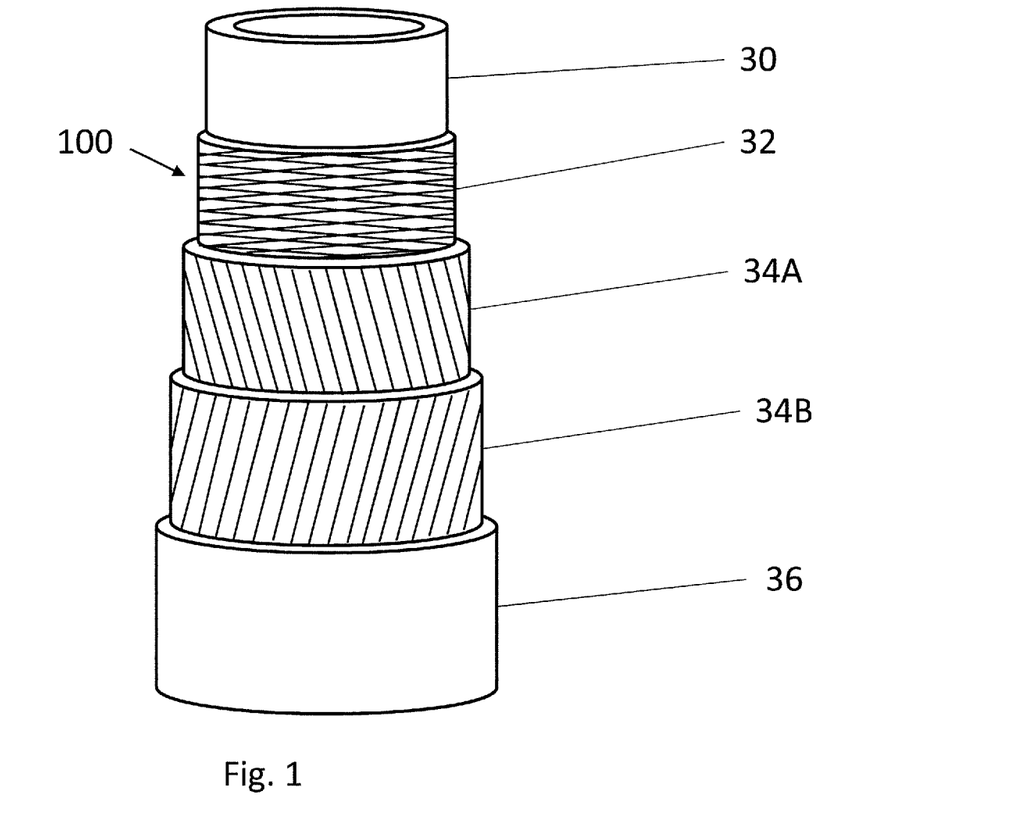
FIG. 1 illustrates a reinforced thermoplastic pipe body in accordance with one or more embodiments of the present disclosure.

A reinforced thermoplastic pipe that may be installed for use in transporting fluids either onshore, offshore, subsea and buried applications, in accordance with embodiments of this disclosure, is shown in FIG. 1, and is designated generally by reference numeral 100. The RTP 100 may be suited for high internal pressure and tension applications, such as production or water injection risers or flowlines, or provide high axial stiffness to improve the pipe's resistance to upheaval buckling in buried applications. The reinforced thermoplastic pipe (RTP) 100 includes an extruded internal pressure barrier layer 30, one or more first braided or helically wound reinforcement layers 32 surrounding the barrier layer 30, one or more second braided or helically wound reinforcement layers 34 surrounding the reinforcement layers 32, and a cover layer 36 surrounding the second reinforcement layers 34. In the embodiment illustrated in FIG. 1, first reinforcement layer 32 is illustrated as a single braided layer and second reinforcement layer 34 is illustrated as a pair of helically counter wound reinforcement sublayers 34A and 34B. The ratio of thicknesses of the individual layers shown in FIG. 1 is merely for illustrative purposes and is not representative of the actual thickness ratios of the tubing in accordance with the preferred embodiments. The outer diameter of the RTP 100 may range from about 2 inches to about 16 inches.

The barrier layer 30 is designed to support the loads induced by application of the outer layers about the barrier layer 30 during manufacture of the pipe, such as during the reinforcement winding processes and the subsequent extrusion of cover layer 36. Further, the barrier layer 30 is designed to prevent conveyed fluid leakage and minimize permeation. The barrier layer 30 may be formed of the most molecularly impervious polymer that meets acceptable material costs. The barrier layer 30 material is selected to be substantially resistant to degradation by the fluid to be passed therethrough. The barrier layer 30 may be formed from a material that is also resistant to corrosion by chemicals and hydrocarbons such as natural gas and petroleum.

In some embodiments, the barrier layer 30 may include a polymer, a thermoset plastic, a thermoplastic, an elastomer, a rubber, a co-polymer, and/or a composite. The composite can include a filled polymer and a nano-composite, a polymer/metallic composite, and/or a metal (e.g., steel, copper, and/or stainless steel). Accordingly, an barrier layer 30 may include one or more of a high density polyethylene (HDPE), a cross-linked polyethylene (PEX), a polyvinylidene fluoride (PVDF), a polyamide, polyethylene terephthalate, polyphenylene sulfide and/or a polypropylene. In one embodiment, the barrier layer 30 has a modulus of elasticity greater than about approximately 50,000 psi, and/or a tensile strength greater than about 1,000 psi.

For upstream oil and gas transportation, HDPE is a cost effective thermoplastic material with good chemical compatibility to water and hydrochloric acid, however, it has poor resistance to crude oil and natural gas condensate at temperatures exceeding 140° F. (60° C.). For petroleum operations, HDPE is particularly useful as it provides good chemical compatibility with many oilfield chemicals at a low cost. The inner diameter of the barrier layer 30 will be designed based on the flow rate of fluids for the application the pipe is designed for.

In some embodiments, the barrier layer 30 may be filled, for example, with amorphous clays, chopped glass or carbon fibers. These materials can enhance barrier layer 30 stability, for example, against low temperature cracking, against polymer creep for long term integrity and may enhance the initial strength of the barrier layer 30 following extrusion. The fibers can be aligned or random.

Although one first reinforcement layer 32 is shown surrounding the barrier layer 30 and one second reinforcement layer 34 is shown surrounding the first reinforcement layer 32 in FIG. 1, it is to be understood that when there are multiple layers of the first reinforcement layer 32 and multiple layers of the second reinforcement layer 34, the multiple layers 32, 34, may include helically wound layers, braided layers, or combinations thereof. The reinforcement layers 32, 34 may be formed of a non-metallic or a metallic material. Helically wound layers may provide greater strength over an equivalent fiber size, strength and count of braided layers due to the fact that adjacent tows in each layer lay more intimately against each other in contrast to the "in and out" pattern associated with a braided construction. In some embodiments, braided layers feature approximately equal portions of tows positioned in substantially opposite helical directions about the core tube and, as such, generally do not require a second braided layer to counterbalance any torsional twist as in the case of a helically wound layer. Helically wound layers generally have two plies which are counter wound in opposite helical directions to achieve torque balance, as illustrated by sublayers 34A and 34B in FIG. 1.

The reinforcement layers 32, 34 can each be configured in various ways from pipe to pipe and from layer to layer. For example, the reinforcement layers 32, 34 can vary by the number, size, material and arrangement of tows in a reinforcement layer, type of layer, winding tension, helical angle of winding and/or amount of tows in any one layer and pipe characteristics can be controlled by selection of these factors. The reinforcement layer 32 mainly carries a hoop load. The reinforcement layer 34 mainly carries an axial load. These loads result from, for example, internal pressure and tensile loading.

In some embodiments, such as if both layers 32, 34 are wound, the first reinforcement layer 32 may be wound under suitable tension about the adjacent layers in such a manner as to provide the amount of coverage desired. In the design of RTP, it is generally desired to cover at least 90% of the outer surface of the adjacent layer in the case where maximum strength is required. The second reinforcement layer 34 may include a plurality of adjacently parallel aromatic polyamide fibers that are wound helically about layer 32 in a direction generally opposite to the direction of layer 32. Layers 32, 34 are each termed as "half-laps" in the trade. Oppositely wound helical layers of fiber are normally used in pairs in hose constructions so as to counterbalance the torsional twist that may occur under pressure by the use of only a single layer wound helically about the barrier layer 30.

In some embodiments, the reinforcing layers 32, 34 can include fibers having at least a partially helical orientation relative to the longitudinal axis of the spoolable tube. The fibers may have a helical orientation between substantially about thirty degrees and substantially about seventy degrees relative to the longitudinal axis 17. For example, the fibers may be counterwound with a helical orientation of about ±40°, ±45°, ±50°, ±55°, and/or ±60°. The reinforcing layers 32, 34 may include fibers having multiple, different orientations about the longitudinal axis. Accordingly, the fibers may increase the load carrying strength of the reinforcing layer(s) 32, 34 and thus the overall load carrying strength of the reinforced pipe 100. In another embodiment, the reinforcing layers 32, 34 may carry substantially no axial load carrying strength along the longitudinal axis at a termination.

The reinforcing layer(s) 32, 34 can each be formed of a number of plies of tows, each tow including fibers. Plies can be formed as tubular braids or as pairs of counter wound helical wraps. If the first reinforcing layer 32 is a braided layer, it may have multiple plies of braided sub-layers. If the second reinforcing layer 34 is a helically wound layer, it may have multiple pairs of counter wound helical layers, each pair being wound in opposite helical directions. Preferably the number of tows and lay angles of the combination of all braided and helically wound plies are selected, such that the pipe is torque balanced and therefore does not substantially twist when subject to internal pressure and tension loads.

The reinforcing layer(s) 32, 34 may include plies of tows with an abrasion resistant material disposed between each ply, or optionally disposed between only certain plies. In some embodiments, an abrasion resistant layer is disposed between plies that have a different helical orientation.

The tows may include structural fibers and flexible yarn components. The structural fibers may be formed of carbon, aramid, thermoplastic, metal, and/or glass. The flexible yarn components, or braiding fibers, may be formed of either polyamide, polyester, aramid, thermoplastic, glass, metal and/or ceramic. The fibers included in the tows of reinforcing layer(s) 32, 34 may be woven, braided, knitted, stitched, stranded circumferentially (axially) wound, helically wound, and/or other textile form.

In one embodiment, the reinforcing layer(s) 32, 34 include tows of fibers having a modulus of elasticity of greater than about 5,000,000 psi, and/or a strength greater than about 100,000 psi. The tows may also include one or more pultruded tapes, where the tapes include structural fibers embedded in a thermoset or thermoplastic polymer matrix.

In some embodiments, an adhesive can be used to bond the reinforcing layer(s) 32, 34 to barrier layer 30. In other embodiments, one or more reinforcing layers 32, 34 are substantially not bonded to one or more of other layers, such as the inner liner, barrier layer 30, or external layer 36.

The tow fibers should also be resistant to degradation by chemicals, such as hydrocarbons and water, which may permeate through barrier layer 30 or may come into contact with the fibers during use of the pipe. Exemplary fibers include but are not limited to graphite, fiberglass, boron, polyester fibers, polymer fibers, mineral based fibers such as basalt fibers, and aramid. For example, fibers can include glass fibers that are e-cr glass, s-glass, d-glass, or a corrosion resistant glass. Elongation to failure of glass is generally less than 5%. However, those skilled in the art will appreciate that other materials can be used in combination with or as a replacement for the materials listed above. Fibers may also be metallic, such as those made of carbon steel, stainless steel, aluminum, or titanium. Fibers or tows may also have a coating or treatment to resist corrosion or degradation. For example, carbon steel fibers may be galvanized or zinc plated.

The tows in the reinforcement layers 32, 34 may include those that are substantially dry such that they will not chemically bond or fuse with other tows or to the liner or sheath. It is to be noted that the tows can be untreated, treated or coated and yet considered dry. Each tow can include one or more individual fibers sometimes twisted together (i.e. in the faun of yarn). In one embodiment, a useful tow contains thousands of individual fibers and is encapsulated with a polymer coating, which does not penetrate the bundle such that the inner fibers remain dry and not chemically bonded or fused together, but are held together as a bundle by the polymer coating.

The tows of reinforcement layers 32, 34 should be wound or braided with substantially uniform tension, sufficient to lay the tows smoothly on the underlying pipe layer. If the tows are not applied to the pipe with substantially uniform tension, there may be tightly wound tows and loosely wound tows in the pipe. The loose tows will not share the load substantially evenly with the tight tows. If all tows are not loaded substantially uniformly, then some fibers in tight tows may break sooner, as their respective load limits will be reached earlier than the designed optimal limit. In embodiments using fibers with low elongation to failure, such as glass, it is to be understood that the fibers will tend not to stretch to accommodate slack in adjacent fibers. The effects of differential elongation to failure should also be considered when using more than one fiber type in a particular layer. On the other hand, if the fibers are wound with undesirably high tension, fibers may tend to be broken during processing and handling, or the tows may have a higher pre-tension than accounted for in the design, thus reducing their capacity to resist applied internal pressure, tension and bending loads in use.

The angle of winding of each reinforcement layer 32, 34 is selected to resist the various loads and conditions to which the product will be exposed during processing and during use with respect to durability, pressure containment and resistance to tensile loads, while providing desired flexibility and axial stiffness. FIG. 1 illustrates the first reinforcement layer 32 as a braided layer and the second reinforcement layer 34 as helically counter wound sublayers 34A and 34B. In some embodiments, the first reinforcement layer 32 may include helically counter wound sublayers 32A and 32B (not shown) and the second reinforcement layer 34 may include a braided layer (not shown). In some embodiments, the first reinforcement layer 32 is braided or wound such that most of the tow length is positioned at a high lay angle relative to the longitudinal axis of the pipe, preferably between 60° and 85°. In some embodiments, the second reinforcement layer 34 is braided or wound such that most of the tow length is positioned at a lower lay angle relative to the longitudinal axis of the pipe, preferably between 20° and 40°. FIG. 1 illustrates the second reinforcing layer 34 overlying the first reinforcing layer 32. However, in some embodiments, the first reinforcing layer 32 could be overlying the second reinforcing layer 34, such that higher lay angle tows in the first reinforcing layer 32 which take more hoop load are overlying tows in the second reinforcing layer 34 which take more axial load.

The one or more second reinforcement layers 34 may be surrounded by the extruded cover layer 36 which may be formed from a material that can withstand long term exposure to underground or underwater conditions. Selection of the cover layer 36 may also be based on the chemical resistance needed for the particular application. In some embodiments, the cover layer 36 may be a high density polyethylene (HDPE). The cover layer 36 may also be a high strength polymeric material such as the polyamide material sold under the mark Nylon®. Alternatively, the cover layer 36 may be formed from a material having good corrosion resistance such as polyvinylidene fluoride (PVDF). A blend of materials may also be used to form the jacket.

The cover layer 36 is at least about 0.030 inches thick to prevent damage to the underlying layers during installation. The cover layer 36 may be thicker than 0.030 inches to provide a smooth exterior surface. The cover layer 36 is preferably applied over the second reinforcement layers 34 by extrusion.

The cover layer 36 can bond to the reinforcing layers 32, 34. In other embodiments, the cover layer 36 is substantially unbonded to one or more of the reinforcing layer(s) 32, 34, or substantially unbonded to one or more plies of the reinforcing layer(s) 32, 34. The cover layer 36 may be partially bonded to one or more other layers of the tube.

The cover layer 36 may provide wear resistance and impact resistance. For example, the cover layer 36 may provide abrasion resistance and wear resistance by forming an outer surface to the reinforced pipe 100 that has a low coefficient of friction thereby reducing the wear on the reinforcing layers from external abrasion. Further, the cover layer 36 can provide a seamless layer, to, for example, hold the inner layers of the reinforced pipe 100 together. Cover layer 36 can be formed of a filled or unfilled polymers. Alternatively, the cover layer 36 can be formed of a fiber, such as aramid or glass, with or without a matrix. Accordingly, the cover layer 36 can be a polymer, thermoset plastic, a thermoplastic, an elastomer, a rubber, a co-polymer, and/or a composite, where the composite includes a filled polymer and a nano-composite, a polymer/metallic composite, and/or a metal. In some embodiments, the cover layer 36 can include one or more of high density polyethylene (HDPE), a cross-linked polyethylene (PEX), a polyvinylidene fluoride (PVDF), a polyamide, polyethylene terephthalate, or a polypropylene. The external layer 56 can include a modulus of elasticity greater than about approximately 50,000 psi, and/or a strength greater than about approximately 1,000 psi.

In some embodiments, the RTP 100 described above may have an axial elongation ranging from about 0.1 to about 0.7%, or from about 0.2 to about 0.6%, or from about 0.3 to about 0.5% under operational conditions.

In one embodiment, the RTP 100 is designed top have high axial stiffness, and therefore low elongation due to internal pressure, axial tension and thermal loads to minimize the potential for upheaval buckling in a buried pipe application, either onshore or offshore. The driving force that creates upheaval buckling is the longitudinal compressive force in a restrained pipeline. When the buried pipeline is pressurized, the endcap force will try to cause the pipe to grow longitudinally. However, the buried pipe is restrained to grow by friction force from soil contact, thus causing a compressive force over the pipe cross-section.

Methods to minimize the potential for upheaval buckling include pre-tensioning or pre-pressurizing the pipeline before it is buried in a trench, burying the pipeline to a suitable depth, increasing the pipe weight or putting extra weight on top of pipe, and increasing the likelihood that the pipe will buckle laterally rather than vertically, by having a meandering pipe path. These options add to the overall installed cost of the pipe and in some cases may not be practical in certain field applications.

The more the pipe grows under internal pressure with free ends, the higher the compressive force with a restrained pipeline. Although increasing the pipe self-weight and bending stiffness will improve the resistance to upheaval buckling, these solutions can add cost to pipe manufacture, transportation and installation and therefore are not desirable in most applications.

Decreasing the pipe's tendency to grow longitudinally under internal pressure and temperature loads is therefore a desirable method to minimize the potential for upheaval buckling.

For an RTP with only a single pair of counter wound reinforcement layers and no other reinforcement layers, or with only a single braided reinforcement layer and no other reinforcement layers, the tows are often laid at or near the neutral angle of 54.7 degrees, at which the hoop and end cap forces due to internal pressure are balanced, avoiding excessive elongation or radial expansion due to internal pressure loading. At the neutral angle, with no other loads besides internal pressure, the axial strain will be zero. A higher lay angle than 54.7 degrees would cause the pipe to elongate in the axial direction under internal pressure, and a lower lay angle than 54.7 degrees would cause the pipe to expand radially more under internal pressure loading, and cause the pipe to shorten in the axial direction. In one embodiment, the lay angles, tows, and number of reinforcement layers 32 and 34 are selected so as to achieve an RTP design with the axial and radial deformation due to internal pressure closer to that achieved by an RTP with only a single pair of counter wound helical reinforcement layers or a single braided layer laid at or near the neutral angle.

For helically wound or braided tows, the strain on tows can be expressed as:

$$\varepsilon = \cos^2 \alpha \cdot \varepsilon_L + R \cdot \sin \alpha \cdot \cos \alpha \cdot \omega + \sin^2 \alpha \cdot \varepsilon_r$$

$$\varepsilon_L = \frac{\Delta u}{L}, \varepsilon_r = \frac{\Delta r}{R}, \omega = \frac{\Delta \phi}{L}$$

Where: $\alpha$ is the lay angle of helical tows; $\varepsilon_L$ is the axial strain of the pipe; $\varepsilon_r$ is the radial strain of pipe; $\Delta u$ is the change in length; $\Delta r$ is the change in radius; and $\Delta \phi$ is the twist; L is the original length; and R is the original radius. An example of a particular embodiment is provided below:

| Parameter | Baseline design straight longitudinal reinforcement | Design benchmark neutral lay angle | Preferred embodiment design |
| --- | --- | --- | --- |
| Nominal pipe size | 4 inch | 4 inch | 4 inch |
| Pipe inner diameter | 3.36 inch | 3.36 inch | 3.36 inch |
| Pipe outer diameter | 4.05 inch | 4.05 inch | 4.05 inch |
| Radial reinforcement | 0.225 lbs/ft reinforcement at 80.8 deg lay angle | 0.377 lbs/ft reinforcement at 54.7 deg lay angle | 0.282 lbs/ft reinforcement at 61.9 deg lay angle |
| Longitudinal reinforcement | 0.096 lbs/ft reinforcement fiber at 0 deg lay angle | | 0.071 lbs/ft reinforcement at 22.19 deg lay angle |
| Axial elongation at 1500 psi | 0.92% | 0.06% | 0.59% |
| Axial compression force pipe experiences when fully buried and at hydro test 2250 psi | 19950 lbf | 100 lbf | 7500 lbf |

In the table above, the axial elongation is calculated with the pipe unconstrained, meaning the pipe ends are free to move in the axial direction and with no external friction along the length of the pipe. The axial compression force is calculated with the pipe fully constrained against movement, with the pipe ends fixed in place and the pipe prevented from buckling in any direction. A buried pipe which is prevented from buckling upward or laterally or growing axially due to fixed ends, soil overburden and soil friction, will be subject to an axial compression force nearly equal to the fully constrained case. Thus, when a pipe is buried, it is a constrained application of the pipe.

Figure 2:
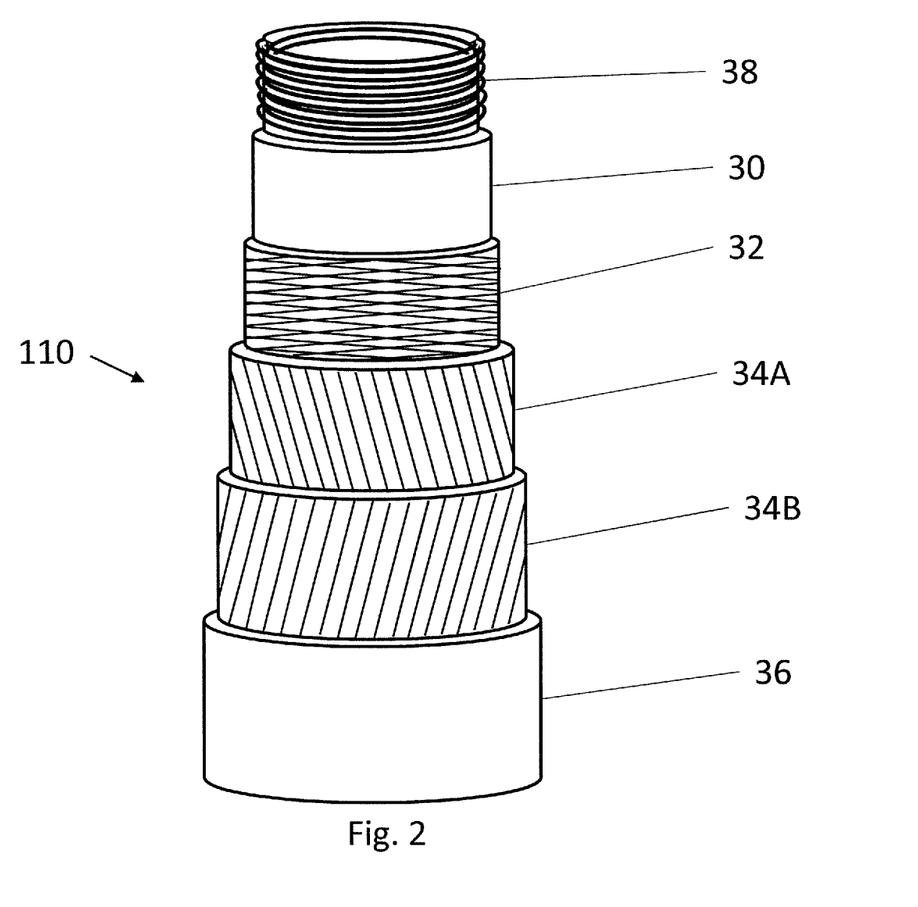
FIG. 2 illustrates a reinforced thermoplastic pipe body in accordance with one or more embodiments of the present disclosure.

Referring to FIG. 2, another embodiment of a reinforced thermoplastic pipe 110 is shown. The reinforced thermoplastic pipe 110 may include the same layers as reinforced thermoplastic pipe 100, described above. In view of the external pressures experienced by an RTP in offshore applications, which have to withstand external hydrostatic pressure forces, the reinforced thermoplastic pipe 110 also includes an inner layer 38 within the barrier layer 30. In some embodiments, the inner layer 38 may be made of metal, such as but not limited to, carbon steel, stainless steel (such as 304L, 316L), lean duplex AL 2003™, duplex 2205 or AL-6XN (a corrosion resistant super alloy). In some embodiments, the inner layer 38 may be an interlocked carcass layer, a flat helically wound layer, or a helically wound layer of round or shaped wire.

The inner layer 38 may prevent collapse of the barrier layer 30 due to pipe decompression, external pressure, and reinforcement layer squeeze pressure and mechanical crushing loads.

The interlocked carcass inner layer 38 has hook and valley regions so that as the layer is wound, adjacent windings are interlocked together by nesting a hook region of a first winding into a valley region of a following adjacent winding. One embodiment of the carcass layer is as detailed in the API 17B Recommended Practice for Flexible Pipe by the American Petroleum Institute, in principle the inner layer, formed from an interlocked metal winding intended essentially to prevent the collapse of the pipe 110 when external pressure or loads exceeds the internal pressure in the pipe, owing to the effect of the external hydrostatic pressure, the pressure generated by the reinforcement plies or external mechanical loads (in particular in the gripping members when laying the pipe). The carcass inner layer 38 may be made of a corrosion-resistant metal strip, generally having a profile having a shape, in cross section, similar to that of a recumbent S and wound so as to produce interlocked turns.

Figure 3:
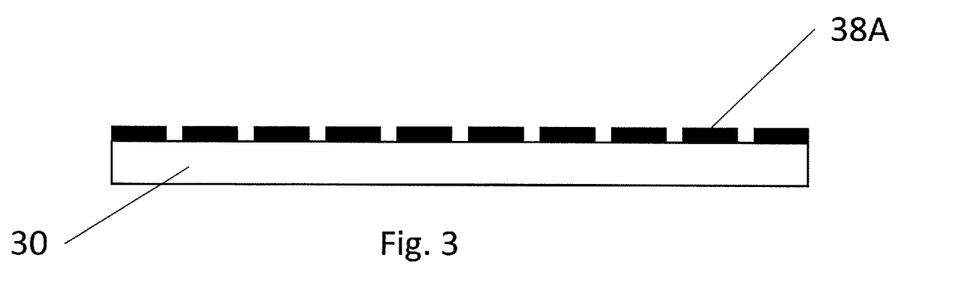
FIG. 3 and FIG. 4 illustrate cross sectional views of a barrier layer and a flat helically wound collapse resistant core in accordance with one or more embodiments of the present disclosure.
Figure 4:
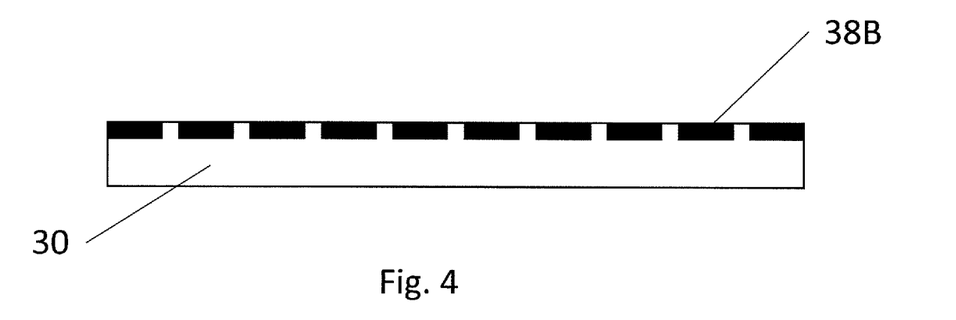

When the inner layer 38 is a flat helically wound layer, the layer is made of a helically wound internal core made of flat strip, the cross-section of the strip having a length in the direction of the length of the pipe which is at least 2 times the thickness of the cross-section of the strip in a direction radially from the pipe. Two embodiments of a flat helically wound internal core are illustrated in FIG. 3 and FIG. 4. In the embodiment shown in FIG. 3, the core 38A is underlying the barrier layer 30, the barrier layer 30 being extruded over the core 38A. In FIG. 4, a flat helically wound internal core is embedded in the barrier layer 30. In both the FIG. 3 and FIG. 4 embodiments, the helical core 38A or 38B may be bonded to the barrier layer 30.

Figure 5:
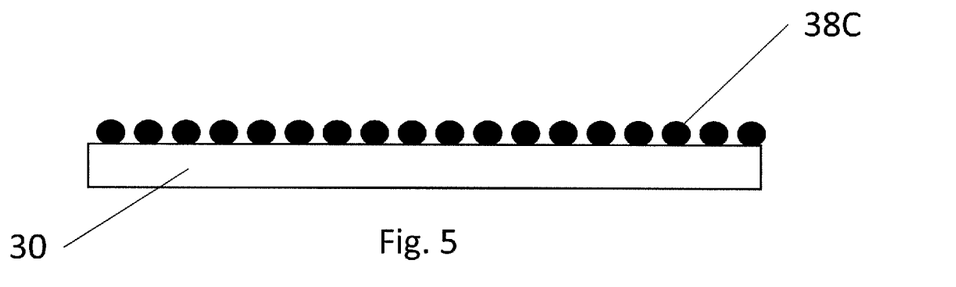
FIG. 5 and FIG. 6 illustrate cross sectional views of a barrier layer and a round helically wound collapse resistant core in accordance with one or more embodiments of the present disclosure.
Figure 6:
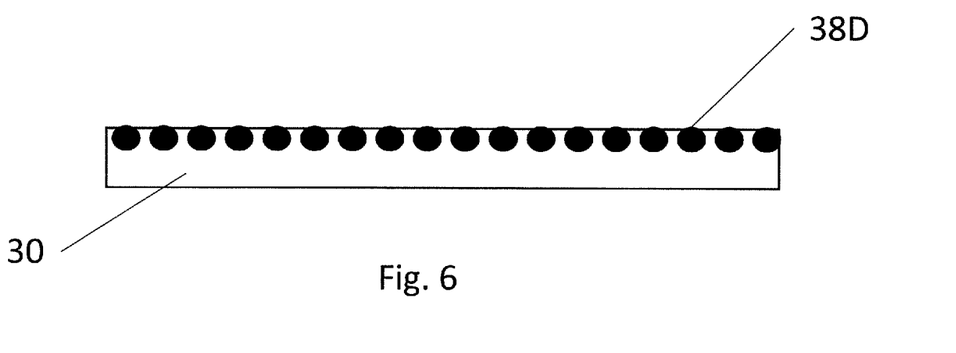

When the inner layer 38 is a helically wound layer of round or shaped wire, the wire could be manufactured by a drawing process. The wire could be partially flattened on the top and bottom. Two embodiments of the helically wound internal core layer of round or shaped wire are illustrated in FIG. 5 and FIG. 6. In the embodiment in FIG. 5, the core 38C is underlying the barrier layer 30, the barrier layer 30 being extruded over the core 38C. In FIG. 6, the flat helically wound internal core 38D is embedded in the barrier layer 30. In both the FIG. 5 and FIG. 6 embodiments, the helical core 38C or 38D could be bonded to the barrier layer 30.

When the inner layer 38 is the helically wound layer, the layer is made of a plurality of continuous coils or turns. The turns are wound with a spiral or helical winding pattern having a helical pitch measured along the central longitudinal axis of the RTP 110 such that adjacent wraps are non-contacting and, thereby, separated or spaced apart from each other by a center-to-center or centerline spacing, s. The centerline spacing, s, may range from about 110 percent to about 500 percent of the diameter, d, of the individual turns. Such spacing may provide higher flexibility and spoolability for the RTP 110. The turns of the helically wound layer may have a round geometrical shape, an oval geometrical shape, a hexagonal geometrical shape, or another suitable geometrical shape.

The cross-sectional area of the turns, as well as the helical pitch of the coil, may influence the flexibility of the RTP 110 and its strength against crushing force and against pressure to resist collapse. Increasing the helical pitch of the coil in the axial direction increases the centerline spacing, s, which increases the flexibility of the hose, but may decrease the strength against flattening and pressure resistance against collapse. Increasing the cross-sectional area of the turns increases the crush resistance against flattening but may reduce flexibility.

The reinforced pipes 100, 110 may also include one or more couplings or fittings. For example, such couplings may engage with, be attached to, or in contact with one or more of the internal and external layers of a tube, and may act as a mechanical load transfer device. Couplings may engage one or both of the inner liner, the external wear layer or the reinforcing layer. Couplings or fittings may be made, for example, of metal or a polymer, or both. In some embodiments, such couplings may allow tubes to be coupled with other metal components. In addition, or alternatively, such couplings or fittings may provide a pressure seal or venting mechanism within or external to the tube. One or more couplings may each independently be in fluid communication with the inner layer and/or in fluid communication with one or more reinforcing layers and/or plies of fibers or abrasion resistant layers, and/or in fluid communication with an external layer. Such couplings may provide venting, to the atmosphere, of any gases or fluids that may be present in any of the layers between the external layer and the inner layer, inclusive.

The reinforced pipes 100, 110, when spooled, may have a radius of curvature of between 7 and 20 times the OD the reinforced pipe. In embodiments where the inner layer 38 used, the radius of curvature may be closer to 20 times the OD, and in embodiments without the inner layer 38, the radius of curvature may be closer to 7 times the OD. With such radii of curvature, the amount of pipe that is spooled at one time may be greater than conventional RTP which has a higher radius of curvature.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A reinforced thermoplastic pipe comprising:
   a polymeric barrier layer formed about a longitudinal axis;
   at least one first non-metallic reinforcement layer configured to carry an internal pressure load surrounding the polymeric barrier layer;
   at least one second non-metallic reinforcement layer configured to carry an axial load surrounding the at least one first non-metallic reinforcement layer; and
   a polymeric cover layer surrounding the at least one second non-metallic reinforcement layer,
   wherein at least one of the first or second non-metallic reinforcement layers is braided wherein lay angles of the at least one first non-metallic reinforcement layer and the at least one second non-metallic reinforcement layer are selected to reduce an axial compression force in the reinforced thermoplastic pipe in a constrained application;
   wherein the lay angles of the at least one first non-metallic reinforcement layer and the at least one second non-metallic reinforcement layer are selected to achieve an unconstrained pipe elongation of less than 0.6%.

2. The reinforced thermoplastic pipe of claim 1, wherein the at least one first non-metallic reinforcement layer is braided or is helically wound as two counter wound sublayers having the lay angle from about 60 to 85 degrees and the at least one second non-metallic reinforcement layer is braided or is helically wound as two counter wound sublayers having the lay angle from about 20 to about 40 degrees.

3. The reinforced thermoplastic pipe of claim 2, wherein the lay angles of the at least one first non-metallic reinforcement layer and the at least one second non-metallic reinforcement layer are selected to achieve the unconstrained pipe elongation of less than 0.3%.

4. A reinforced thermoplastic pipe comprising:
   a polymeric barrier layer formed about a longitudinal axis;
   at least one first non-metallic reinforcement layer configured to carry an internal pressure load surrounding the polymeric barrier layer;
   at least one second non-metallic reinforcement layer configured to carry an axial load surrounding the at least one first non-metallic reinforcement layer;
   a polymeric cover layer surrounding the at least one second non-metallic reinforcement layer; and
   an interior helical metallic layer around which the polymeric barrier layer is formed, the interior helical metallic layer being an interlocked metallic carcass, a flat helically wound strip or a helically wound wire;
   wherein lay angles of the at least one first non-metallic reinforcement layer and the at least one second non-metallic reinforcement layer are selected to achieve an unconstrained pipe elongation of less than 0.6%.

5. The reinforced thermoplastic pipe of claim 2 having a collapse resistance threshold (maximum design water depth) ranging from about 100 feet to about 5000 feet.

* * * * *

UNITED STATES PATENT AND TRADEMARK OFFICE
CERTIFICATE OF CORRECTION

PATENT NO. : 10,935,168 B2
APPLICATION NO. : 16/197765
DATED : March 2, 2021
INVENTOR(S) : Liang Yu et al.

Page 1 of 1

It is certified that error appears in the above-identified patent and that said Letters Patent is hereby corrected as shown below:

In the Claims

Column 12 Line 39, replace of claim 2, with of claim 4

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*